United States Patent [19]

Okamoto

[11] 4,380,438

[45] Apr. 19, 1983

[54] AUTOMATED STUDY VOICE RECORD/REPRODUCTION SYSTEM

[75] Inventor: Ikuko Okamoto, Tokyo, Japan

[73] Assignee: Yugen Kaisha Batora Konsaruteingu, Tokyo, Japan

[21] Appl. No.: 298,216

[22] Filed: Aug. 31, 1981

[51] Int. Cl.³ .............................................. G09B 5/04
[52] U.S. Cl. .................................. 434/157; 434/320; 434/321
[58] Field of Search ....................... 434/157, 320, 321

[56] References Cited

U.S. PATENT DOCUMENTS 3,142,909 8/1964 Irazoqui .......................... 434/320 X
3,323,230 6/1967 Cooper ............................... 434/320
3,596,378 8/1971 Flubacker .......................... 434/320
3,777,417 12/1973 MacNeill et al. .................... 434/320

*Primary Examiner*—William H. Grieb
*Attorney, Agent, or Firm*—Pollock, Vande Sande & Priddy

[57] ABSTRACT

A foreign language study reproduction voice record system which allows automatic operation under control of a predetermined study procedure program. More specifically, the system is disclosed wherein there are provided a tape or tapes on which are recorded program signals indicative of study procedures, master study materials voice signals and identification signals indicative of blocks for pronunciation practice, the program signals are beforehand stored or loaded in a memory of a microcomputer prior to starting of master study, so that reproduction of the master study materials recording of student's pronunciation voice are automatically effected under control of the program, thereby allowing efficient and effective self-study of recorded foreign or native language instruction materials.

9 Claims, 13 Drawing Figures

AUTOMATED STUDY VOICE RECORD/REPRODUCTION SYSTEM

BACKGROUND OF THE INVENTION

The present invention relates generally to an automated study voice record/reproduction system and more particularly, concerns a study voice record/reproduction system which allows continuous and automatic operation under control of predetermined programs to achieve the most effective studying procedures in studying a foreign or native language.

A basic problem in effective self-study of a foreign language is that the student must study alone, and therefore does not have a teacher present to guide his study procedures. As a result, there is no way to assure that the student will follow the proper sequence of procedures for the effective study of the recorded language materials, since the operation of prior art foreign language studying machines is done manually by the student. It is therefore possible for the student to make mistakes in his study procedures which hinder his efforts to acquire proficiency in the language being studied.

The following five-step process is the most efficient and effective method for the self-study of recorded foreign language instruction materials:

1. Reproduction of a segment of master voice sentences in the instruction materials for comprehension.
2. Reproduction of a single division or frame (which is called "block" hereinafter) of the study master voice sentences for productive drill by the student as follows.
   (a) Hear one block master voice sentence.
   (b) Stop the block master voice sentence.
   (c) Repeat the just reproduced block sentence aloud.
   (d) Rewind or reverse the magnetic tape to the beginning of the block master voice sentence.
   (e) Repeat steps (a), (b), (c) and (d) as many times as necessary to achieve full productive ability to reproduce the sentences with the same pronunciation as the master voice.
3. Record student's voice immediately following the master voice sentence.
4. Reverse the recording of the master voice and student's voice to the beginning of the master voice sentence and then replay for comparison of the student's voice and master voice pronunciation.
5. Repeat the above steps 2 to 4 as many times as necessary to achieve complete ability to reproduce perfectly the foreign language master voice block sentence or sentences.

There have been some attempts in the past to provide tape recorders for foreign language study which reproduce master voice sentences for comprehension practice or which both reproduce the master voice sentences of a foreign language and allow the student to record his own voice after the master voice for comprehension. However, such prior art machines have either not provided a comprehensive capability which covers all five steps of the above-defined study process, or they have been restricted to a linear presentation of the study materials, or they have been manually operated and therefore have not provided an efficient programmed presentation of the study materials.

SUMMARY OF THE INVENTION

The object of the present invention is to provide an automated foreign language studying system which performs all five of the above-defined study processes in an effective and efficient manner such that the student can develop the ability to reproduce perfectly the foreign language master voice sentences.

According to one embodiment of the invention, the object can be achieved by providing an automated tape recorder in which the basic study processes are programmed and coded beforehand to store them on magnetic tape. Prior to studying, the programs are read to load them in to the microcomputer which in turn functions to issue control signals to operate the tape recorder under control of the programs.

DESCRIPTION OF THE PREFERRED EMBODIMENTS

The present invention will be explained with reference to preferred embodiments in conjunction with the accompanying drawings.

Figure 1:
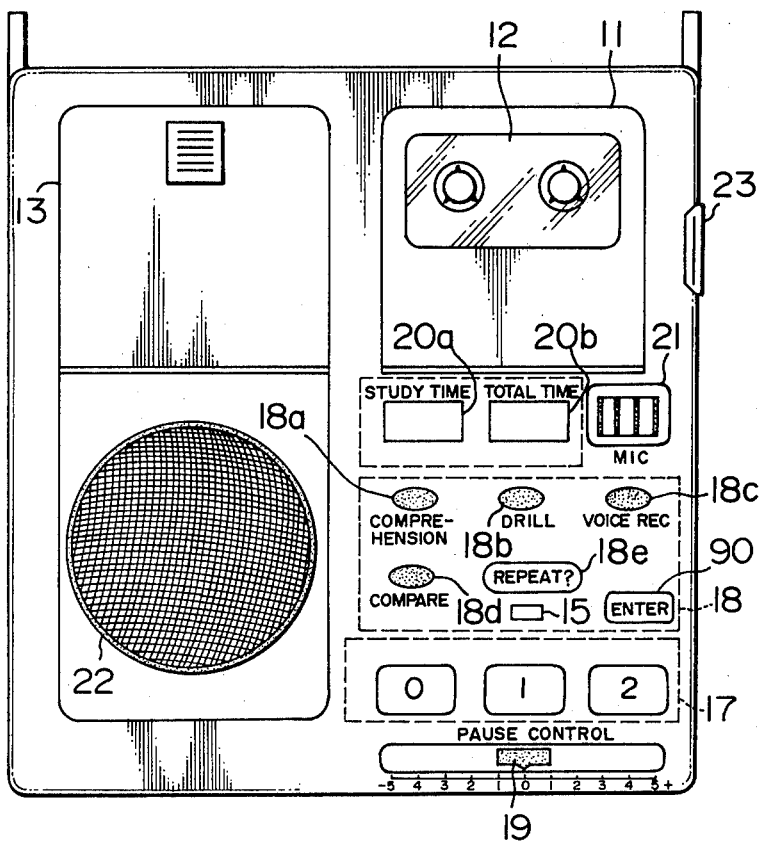
FIG. 1 is a top view of a form of an automated study reproduction voice record system in accordance with the present invention.

Referring now to FIG. 1, there is shown a microcassette type tape recorder of a form of the present invention, but it should be readily clear that regular size cassette tape, open-reel tape, or any other recorded and recordable materials that can be played and reversed for replay could be used for the invention.

In the tape recorder of FIG. 1, a first tape receptacle 11 contains microcassette tape 12 having master voice study materials recorded; and a second tape receptacle 13 on the left side of the first receptacle 11, which contains microcassette tape 16 having a student's native-language study directions recorded. On the opposite side of the second tape receptacle 13, a third tape receptacle (not shown) is provided which houses record/play microcassette tape 14 to record the master voice tape 12 study sentences and the student's voice as necessary. A group of push-buttons 17 consisting of three operating push-buttons are used to cause the starting of a microcomputer and simultaneously to provide the assignment of a desired textbook to be studied. More specifically, the study system of the present invention is supplied with, in addition to the two types of tapes described above, textbooks (studies) which have their own symbols for the headings or titles; and pushing the three push-buttons in the sequence of a particular symbol will cause the textbook to be specified, together with the starting of the microcomputer.

Once started, the tape recorder automatically operates according to the five steps already described above. Each operating step of the recorder in operation is indicated by one of five mode indicators or lights forming a group of lights 18 wherein light 18a is activated when the recorder is in the master voice sentences comprehension step or mode, light 18b is activated when it is in the oral practice step or mode, light 18c is activated when it is in the recording state or mode, light 18d is activated when it is in the master/student voice comparison step or mode, and light 18e is activated when oral practice corresponding to one division or block of the master voice has been finished, while requiring the student to decide whether or not to repeat the oral practice again. If student wishes to repeat it, then he depresses push-button 15. To vary properly the length of microcomputer programmed pause time for oral practice, a slidable pause control 19 is provided.

For the student's convenience for self-study, the tape recorder is further provided with a timer 20a for indicating unit study time and a timer 20b for indicating the total study time. These timers are both of a liquid crystal type and indicated in a digital manner. The recording of the student's voice is made by a built-in microphone 21. Reproduction signals from the tape 12, 14 or 16 are reproduced through loudspeaker 22.

Figure 2:
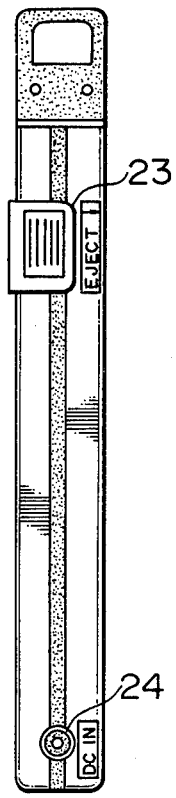
FIG. 2 is a side view as viewed from the right of the system of FIG. 1.

A right side view of the microcassette tape recorder of FIG. 1 is shown in FIG. 2 wherein an ejecting mechanism 23 acts to remove or eject the cassette tape 12 from the tape receptacle 11 by moving the ejector downwards. The cassette tapes 14 and 16 can be removed in the similar way by means of similar ejecters provided on the left side of the tape recorder. Further, although power of the tape recorder is supplied from built-in batteries, it may also be obtained from an external power jack 24 which leads to an external power supply.

Figure 3:
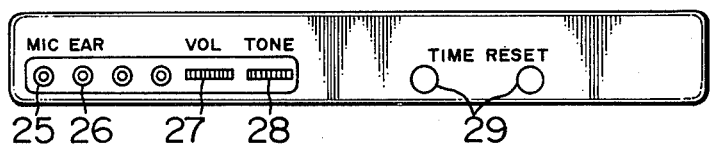
FIG. 3 is a back view of the system of FIG. 1.

FIG. 3 shows a back view of the tape recorder of FIG. 1, and includes an external microphone jack 25, a earphone jack 26, a volume control for adjustment of voice level, a tone control 28 for adjustment of voice tone, and push-buttons 29 for resetting of the timers 20a and 20b respectively. The student's voice may be recorded through the microphone jack 25 leading to an external microphone, in place of the built-in microphone 21.

Figure 4:
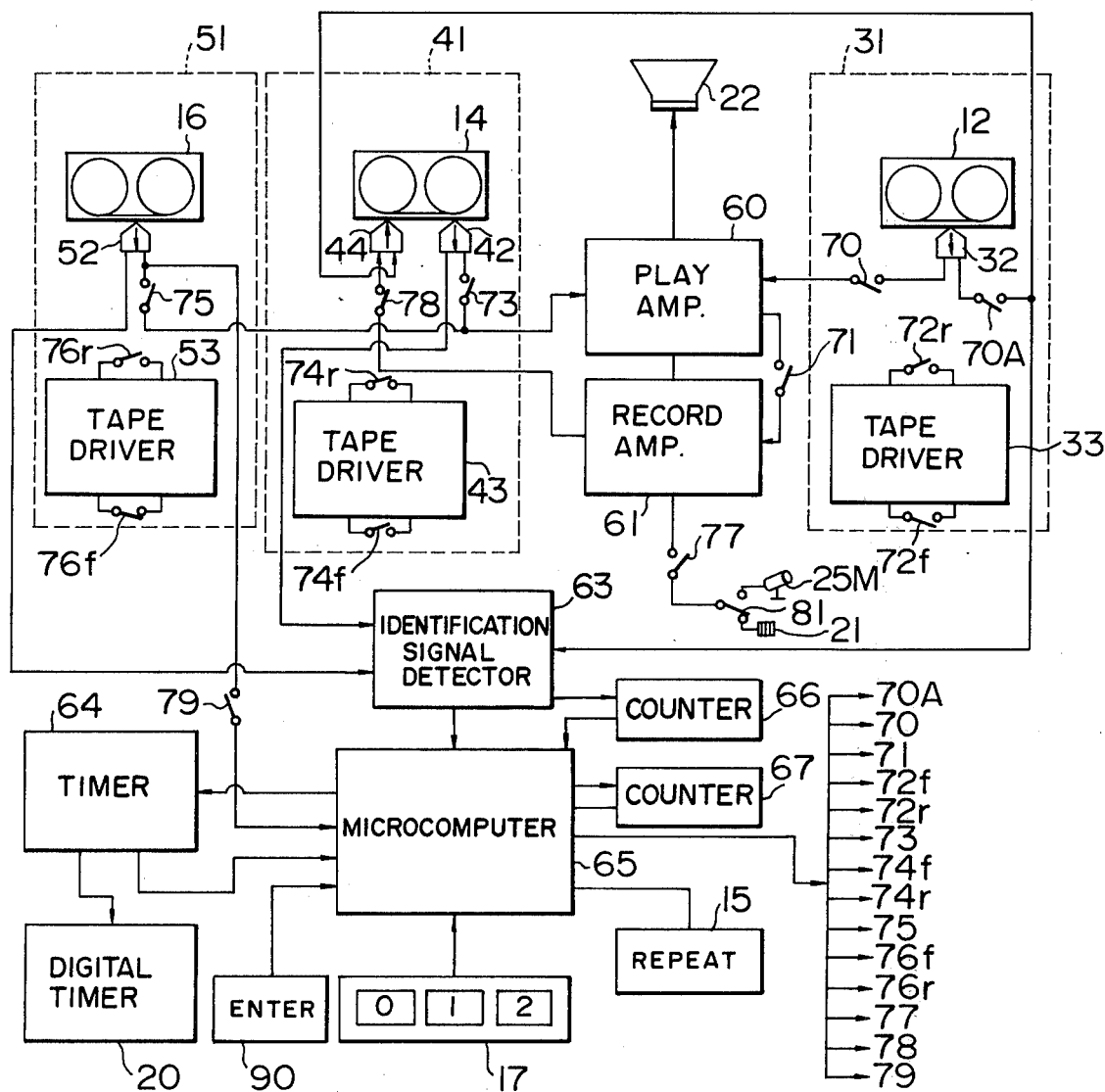
FIG. 4 is a block diagram of the system as a first embodiment of the present invention.

Turning next to FIG. 4, there is shown a circuit configuration of the automated voice record/reproduction study system according to the present invention. The system will now be detailed with reference to FIG. 4, in which case, three types of tapes, that is, the master voice tape 12, the record/play tape 14 and the program tape 16 are used.

A master study materials play section 31 includes the master voice tape 12, a play head 32 capable of reproducing two tracks on the master tape simultaneously and a tape transport mechanism or tape driver 33. A record/play section 41 includes the tape 14, a play head 42 capable of reproducing two tracks on the tape 14 simultaneously, a tape transport mechanism or tape driver 43 and a record head 44 capable of recording on the two tracks on the tape 14. Similarly, a program play section 51 for reproduction of programs and directions includes the program tape 16, a play head 52 capable of reproducing two tracks on the tape 16 and a tape tansport mechanism or tape driver 53.

Figure 5:
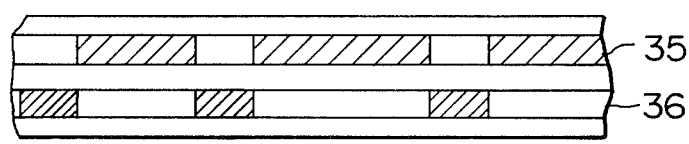
FIG. 5 is an explanatory view showing the recording state of typical magnetic tape for use with the circuitry of FIG. 4.
Figure 6A:
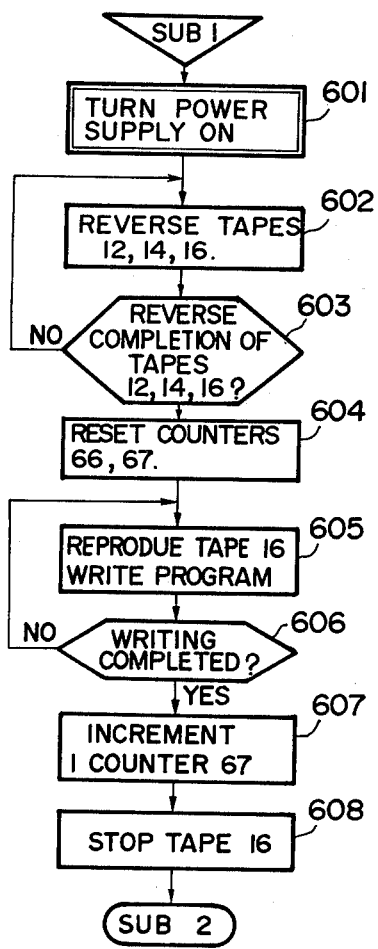
FIGS. 6A to 6D show jointly a flow chart for explanation of how the circuitry of FIG. 4 operates.
Figure 6B:
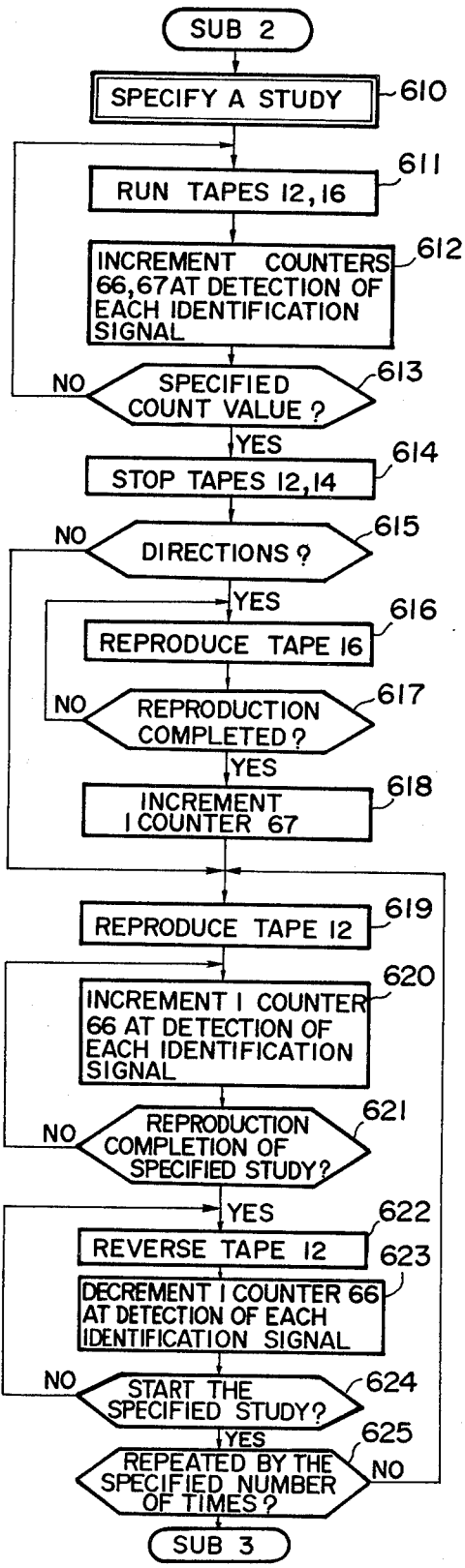
Figure 6C:
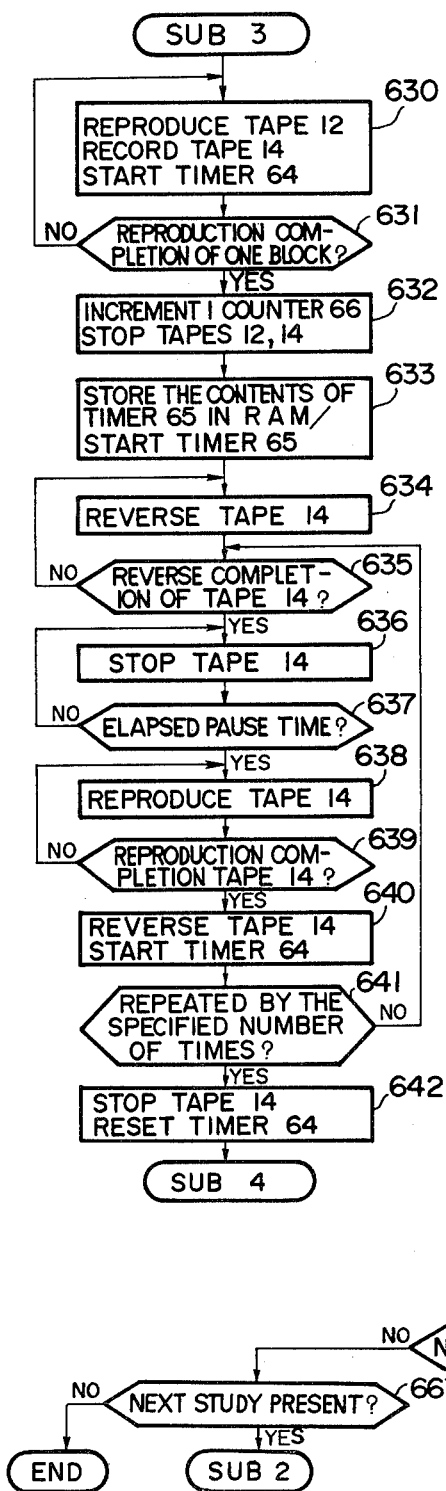
Figure 6D:
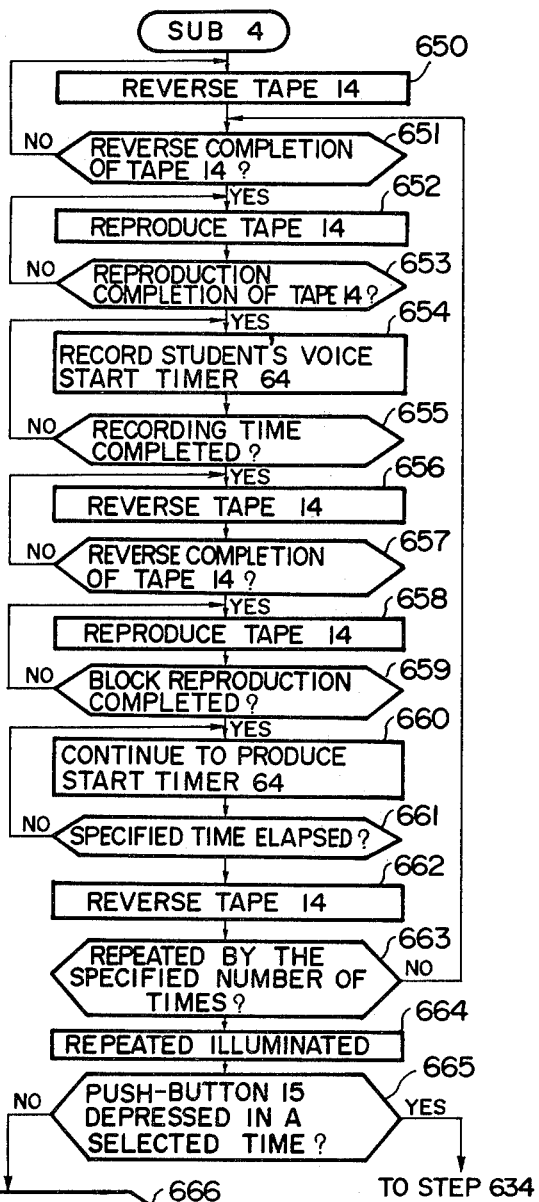

In operation, when the master materials play section 31 is activated, the play head 32 reproduces the master voice already recorded on the tape 12. The master voice tape 12 has a pair of tracks as illustrated in FIG. 5 and the play head 32 is capable of reproducing signals on the track pair simultaneously and separately. On a first track 35 of the master voice tape 12 master study materials voice is recorded as divided into frames or blocks of a length necessary for oral productive drill, while on a second track 36 frequency signals (which are sometimes hereinafter called identification signals) for block identification are recorded between the adjacent master voices. A play signal from the first track 35 is supplied via switch 70 and play amplifier 60 to the speaker 22, and also supplied via the amplifier 60, switch 71, recording amplifier 61 and switch 78 to the first track input of the recording head 44. On the other hand, an output signal of the second track 36 from the play head 32 is sent through a switch 70A to an identification signal detection circuit 63 and to the second track input of the record head 44. The tape driving mechanism 33 has two normally open switches 72f and 72r such that the tape 12 is run forward when the switch 72f is closed and it is run backward or rewound when the switch 72r is closed. In general, the tape rewinding speed is higher than the forward running one.

In the record/play section 41, the play head 42 is capable of reproducing signals on the first and second tracks of the tape 14 separately. A play signal from the first track is applied via switch 73 and the play amplifier 60 to the loudspeaker 22. The output signal of the second track from the play head 42 is applied dirrectly to the identification signal detection circuit 63. Like the tape driver 33, the tape driver 43 has two normally open switches 74f and 74r such that the tape 14 is run forward when the switch 74f is closed and it is run backward or rewound when the switch 74r is closed.

In the program play section 51, the play head 52 is capable of recording signals on the first and second tracks of the tape 16 simultaneously or separately. On the first track of the tape 16 voice study instructions and the programs, including the recorder operating procedures, are recorded. On the second track of identification signals as frequency signals for identification between the adjacent program/instruction voices are recorded. An output signal of the first track from the play head 52 is supplied via switch 79 to microcomputer 65, and also supplied via switch 75 to the play amplifier 60. An output signal of the second track from the play head 52 is applied directly to the identification signal detecting circuit 63. Like the tape transport mechanisms 33 and 43, the tape transport mechanism 53 has two normally open switches such that the tape 16 is run forward when the switch 76f is closed and it is run backward or rewound when the switch 76r is closed.

Switch 81 selectively connects an external microphone 25M or the built-in microphone, the output of which is sent through switch 77 to the recording amplifier 61.

Each time the identification signal detection circuit 63 detects an identification signal from the second track of the tape 12 or 16, the circuit 63 converts the detected signal into a pulse which is sent to the microcomputer 65. Then the microcomputer 65 controllably sends a pulse resulting from an identification signal from the tape 12 to a counter 66 and a pulse resulting from identification signal from the tape 16 to a counter 67 such that the associated counter counts up when the associated tape runs forward and counts down when the associated tape runs backward.

A timer circuit 64 provides the timing control of the entire system on the basis of a command from the microcomputer 65. In this embodiment, the timing control is directed over the one block length of master study materials voice, the pause time for productive drill and the study time. In this connection, the pause time for productive drill can be set somewhat longer than the timed block length of master voice by controlling suitably the slidable control 19, and the set value is placed in the memory of the microcomputer 65. The then specified study and total times are digitally indicated on the timers 20a and 20b respectively.

Of the switches already explained above, the switches 70A, 70, . . . , and 79 other than the switch 81 are all controlled to open or close simultaneously or separately in accordance with the microcomputer programmed procedures. The program basically consists of a number of indispensable subroutines to achieve continuous and automatic operation of the above five steps. In this embodiment, four basic subroutines have been preferably defined for indispensable basic operation. The subroutines are loaded into the read only memory (ROM) built in the microcomputer in a programmed form, so that these four subroutines can be called at a desired point of the tape recorder operation to allow operation under control of the program. This programmed operation will be explained with reference to FIGS. 6A to 6D.

A first subroutine is used for study preparation and comprises the following three steps.

Step 1: In this step, the tapes 12, 14 and 16 are housed in the respective tape receptacles. When the power switch is turned on (step 601), the switches 72r, 74r and 76r are closed to reverse the tapes 12, 14 and 16 to the beginning thereof (step 602).

Step 2: In this step, the completion of the tape reversing to the beginning is sensed by any means well known in the prior art, for example, by a technique of detecting the conductive foil attached to the leading end of tape when the foil comes into contact with the associated contact (step 603). This detection will cause the switches 72r, 74r and 76r to be opened and the counters 66 and 67 to be reset to zero value under control of the mirocomputer 65 (step 604).

Step 3: As soon as the microcomputer 65 detects that the three tapes have all been set to the beginning thereof, it will cause the switches 76f and 79 to close to put the program play section 51 again into the play mode. The study procedure program for each study unit pre-recorded at the beginning of the first track of the tape 16 in a coded form are loaded or stored into the microcomputer memory (RAM) (step 605). After the program has been read (step 606), an identification signal is read from the second track of the tape 16 and is converted to a pulse at the identification signal detection circuit 63. The microcomputer 65 will cause the counter 67 to count up or increment with this pulse (step 607) and also the switches 76f and 79 to open to place the program play section 51 in the inactive mode (step 608).

A second subroutine is four instruction materials comprehension and comprises the following six steps.

Step 1: When the operator specifies a number designated for each textbook study unit, for example, "010" by pushing the corresponding numbered push-buttons in the operating push-button group 17 and then pushes an ENTER push-button 90 (step 610), the switches 72f and 76f in the program play section 51 will be closed to run the tapes 12 and 16 (step 611). While the tapes run, identification signals from the tapes 12 and 16 are converted to the respective pulses so that the pulses cause the respective counters 66 and 67 to count up or increment (step 612). As soon as the counters reach respective specified count levels (step 613), the switches 72f and 76f will open to stop the associated tapes (step 614).

Step 2: When the program commands recorded in the RAM at step 3 in the first subroutine mean the reproduction of study instructions on the tape 16 concerning the specified study (step 615), the computer 65 will cause the switches 76f and 75 to close to issue the instructions voice from the speaker 22 (step 616).

Step 3: If the program commands do not mean the reproduction of study instructions or completion of the study instructions has been detected with an identification signal from the second track of the tape 16 (step 617), then the counter 67 increments 1 (step 618), so that when the switches 76f and 75 are opened, the switches 72f and 70 will close to drive the tape 12 forward for reproduction of the specified study (step 619). Each time an identification signal is detected during the reproduction, the counter 66 counts up (step 620).

Step 4: When the completion of the specified one textbook unit has been detected on the basis of the count value in the counter 66 (step 621), the switches 72f and 70 will open and the switch 72r will close to reverse the tape 12 (step 622). Each time an identification signal is detected during the tape reversing operation, the counter 66 will count down (step 623).

Step 5: When the tape 12 has been reversed to the beginning of the specified textbook study unit and the completion of the tape reversing operation has been detected on the basis of the count value of the counter 66 (step 624), the switch 72r will open and the switches 72f and 70 will close to reproduce the textbook study unit recorded on the first track of the tape 12.

Step 6: After the steps 4 and 5 have been repeated as many times as selected (step 625), the tape will be returned to the beginning of the specified study to complete the subroutine.

Our attention will be next directed to a third subroutine for oral productive drill of one division or block into which the specified one textbook study unit is divided. The third subroutine comprises the following six steps.

Step 1: When the completion of the second subroutine has been detected or a command is issued from the control section of the microcomputer 65, the switches 72f and 70 will close to reproduce the master instruction materials on the first track of tape 12 and switches 71, 78 and 74f will close such that the reproduction or play signal is recorded on the first track of tape 14 and that the identification signal on the second track of tape 12 is recorded on the second track of tape 14. Simultaneously, the timer circuit 64 is activated to provide the timed play time to the specified block of the master instruction materials (step 630).

Step 2: When the completion of the reproduction of master materials block specified by an identification signal from the second track of tape 12 (step 631), counter 66 will count up by 1 (step 632), resulting in that switches 70, 72f and 70A open to put the study materials play section 31 into the inactive mode, switches 78 and 74f open and switch 74r closes so as to put tape 14 into the reversed mode (step 634), and play time set by the timer circuit 64 is stored or loaded in the RAM of the microcomputer 65 to immediately start the timer circuit 64 (step 633).

Step 3: When an identification signal representative of record start point has been detected from the second track of tape 14 (step 635), switch 74f will open to stop tape 14 (step 636). During the tape stopping, the student repeats the master play voice aloud. In this case, the program will prevent the counter 66 from counting up or down.

Step 4: When the timer circuit 64 has elapsed by time period X number of seconds longer than the set time stored in the RAM, the pause time for oral practice has been terminated (step 637), so that switches 74f and 73 will close to reproduce the same master materials block (step 638).

Step 5: When the completion of the block reproduction has been detected with an identification signal from the second track of the tape 14 (step 639), switches 74f and 73 will open and switch 74r will close to reverse tape 14 and to start the timer 64 (step 640). As in the step 3, the program will prevent the counter 66 from counting up or down.

Step 6: When the operation from the step 3 to the step 5 has been repeated as many times as selected (step 641), all switches in the record/play section 41 will open and the timer circuit 64 in the step 5 operation will stop (step 642).

Finally, explanation will be made about the fourth subroutine which, following the third subroutine in which oral practice has been made about the master materials block, acts to record the student's voice of the master block for comparison of the master block voice and the student's voice and which comprises the following eight steps.

Step 1: When the termination of the third subroutine has been detected, switch 74r will close to reverse tape 14 (step 650).

Step 2: When the starting point of the oral practice materials block has been detected with an identification signal from the second track of tape 14 (step 651), switch 74r will open and switches 74f and 73 will close to reproduce the block (step 652).

Step 3: When the termination of the reproduction has been detected with an identification from the second track of the tape 14 (step 653), switch 73 will open and switches 77 and 78 will close to record the student's voice and start the timer circuit 64 (step 654).

Step 4: When the set time of the timer circuit 64 has elapsed X number of seconds longer than the time stored in the RAM (step 655), switches 77, 78 and 74f will open and switch 74r will close to reverse the tape 14 (step 656).

Step 5: When the master materials starting point has been detected with an identification signal from the second track of tape 14 (step 657), switch 74r will open and switches 73 and 74f will close to put the tape in the play mode (step 658).

Step 6: When the termination of reproduction of the master materials block has been detected (step 659), the reproduction state will maintain and the timer circuit 64 will start (step 660).

Step 7: When the set time of the timer circuit 64 has reached X number of seconds longer than the set time stored in the RAM (step 661), switches 73 and 74f will open and switch 74r will close to reverse the tape 14 (step 662).

Step 8: When the operation from step 2 to step 7 has been repeated as many times as selected (step 663), REPEAT indicator light 18e will be illuminated (step 664). If the student wishes to repeat the just practised block, then he depresses the push-button 15 within a predetermined time period (step 665). This will cause the program to return to step 634. If, on the other hand, the student wishes to proceed to the next block, he waits for the predetermined time period without pushing push-button 15. This will cause the program to go to step 666 so that the presence of the next block will cause control to return to the third subroutine. When the termination of the study has been decided at step 666, the presence or absence of the next study is decided at step 667. If the decision is YES, then the program will return to the second subroutine to proceed to the next study. When the decision is NO, the system will stop.

By combining the four subroutines described above with programs and manual operations, a proper program can be created for foreign language self-study on the basis of the five study procedures explained earlier.

Next, explanation will be made in connection with the five study procedures in more detail. 1. The study procedure or step for comprehension of one study unit of instruction materials is performed by the second subroutine. 2. Oral practice of one block in the study is performed by the third subroutine. 3. Recording of oral practised student's voice of one block is performed by the first half portion of the fourth subroutine. 4. Reproduction of the master voice and the student's voice for comparison is performed by the latter half portion of the fourth subroutine. Judging from the comparision, if the student wishes to repeat the same block further, he depresses the REPEAT pushbutton 15 in a predetermined time period to allow the program to return to the above step 2. 5. The above steps 2 to 4 are repeated with respect to all the blocks in the study to complete the entire study. If the student still feels the necessity to repeat the same study, he can start the study from the beginning starting with the above step 1.

The find study steps are applied to all studies to be mastered in a proper programmed sequence.

In accordance with the present invention, all the study steps can be programmed for an efficient and automatic study purpose, but, as has been described above, the invention preferably allows appropriate manual operations depending upon the student's ability or preference.

Although two track tape has been used in the above explanation, it will be easily understood from FIG. 5 that one track tape may be employed by inserting an identification signal between a voice signal and a program signal in order to achieve the same function as the above two track tape. However, the identification signal must be a signal definitely distinguished from the related voice signal and program voice. In addition, the identification signal must be selected so as to have a frequency other than the voice frequency band to be reproduced, or so as not to be supplied to the play amplifier 60 through a quick responsive switching circuit. However, these problems occur at the time of designing the system and can be eliminated by a prior art method well known in the art, and thus the detailed explanation will be omitted.

Figure 7:
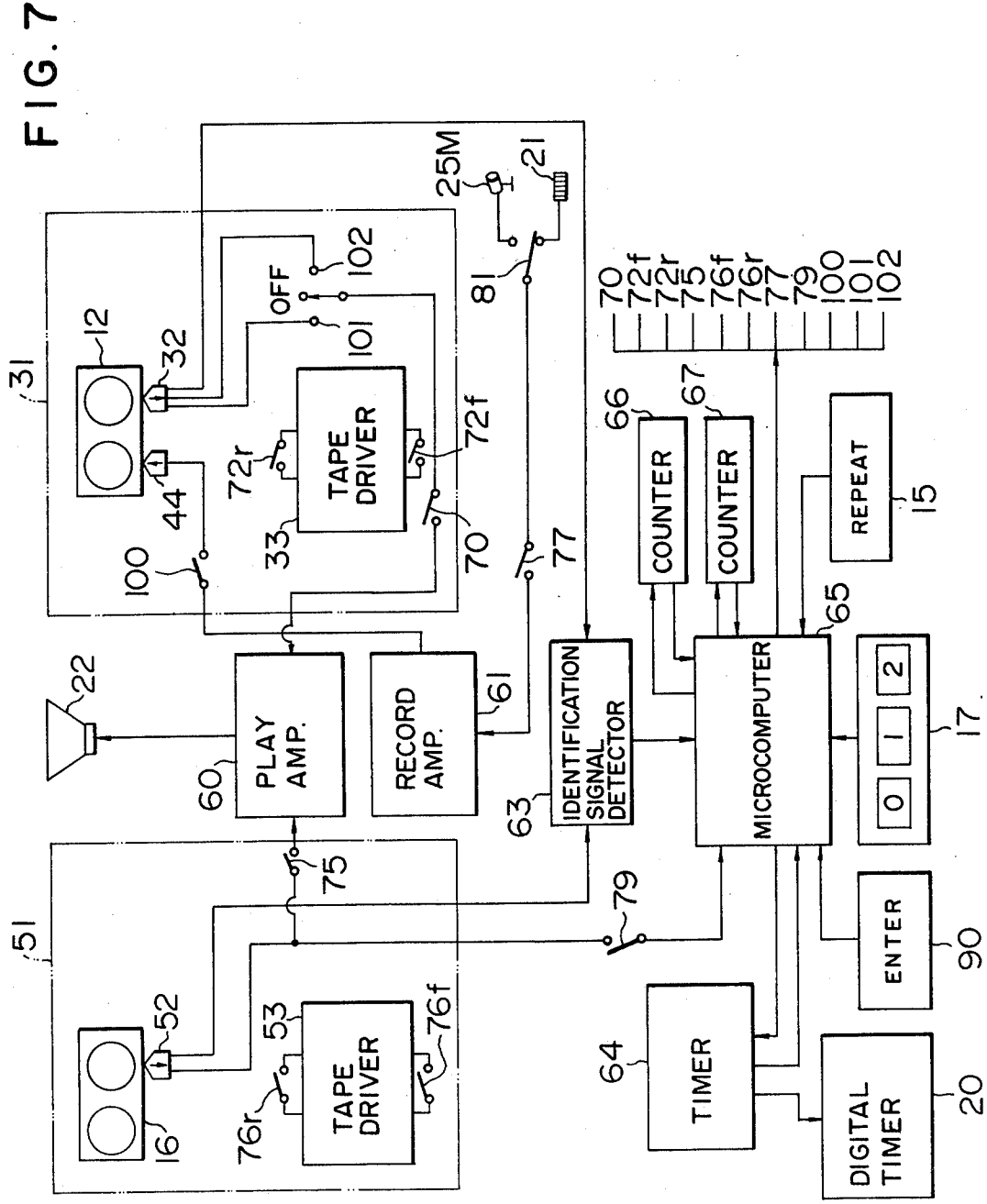
FIG. 7 is a block diagram of the system as a second embodiment of the present invention.

Turning next to FIG. 7, there is shown another embodiment of the block diagram of a tape recorder in accordance with the present invention. The embodiment of FIG. 7 is different from that of FIG. 4 in the respect that the former employs two types of tape, i.e. the master voice tape 12 and the command tape 16, but is similar thereto in the circuit configuration and operation. Therefore, elements already described with reference to FIG. 4 are denoted in FIG. 7 by the same reference numerals as in the previous embodiment.

The record/play section 31 includes the master voice tape 12, the play head 32 capable of reproducing three tracks of the tape 12 simultaneously, the record head 44 and the tape transport mechanism 33. The command play section 51 for reproduction of program voice and instruction voice includes the command tape 16, the play head 52 capable of reproducing two tracks of the tape 16 simultaneously and the tape transport mechanism 53.

Figure 8:
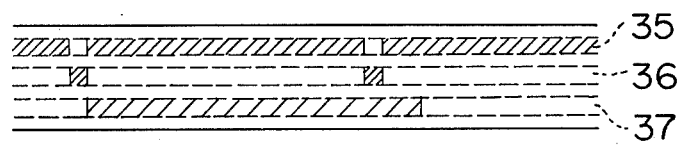
FIG. 8 is an explanatory view showing the recording state of typical tape for use with the circuitry of FIG. 7.

When the record/play section 31 is activated, the play head 32 will reproduce the master voice recorded on the tape 12. The master voice tape 12 contains three tracks as illustrated in FIG. 8, and the play head 32 is capable of simultaneously separately detecting signals on the three tracks. On a first track 35 of the master voice tape 12 master study materials voice is recorded as divided into frames or blocks of a length necessary for oral productive drill, while on a second track 36 identification signals are recorded between the adjacent master voices. A play signal from the first track 35 is supplied via a switch 101 and the switch 70 to the loudspeaker 22. An output signal of the second track 36 from the play head 32 will be applied to the identification signal detection circuit 63. On the other hand, on a third track 37 of the tape 12 voice signals from the microphone are recorded by means of the recording head 44, and the recorded signals are sent via the play head 32, a switch 102, the switch 70 and the recording amplifier 60 to the speaker 22 for reproduction. The arrangement other than described above is substantially identical with FIG. 4.

Of the four subroutines already described in connection with FIG. 4, the third and fourth subroutine alone are considerably different in FIG. 7 and therefore they will be described in the following.

The third subroutine for oral practice comprises the five steps.

Step 1: When the second subroutine has been terminated or an instruction has been issued from the control section of computer 65, switches 72f, 101 and 70 will close to reproduce master voice on the first track of the tape 12. At the same time, this will activate the timer circuit 64 to provide the timing of the block play time to the specified study.

Step 2: When the termination of reproduction of the specified master materials block has been detected with the first identification signal from the second track of tape 12, the counter will count up by 1 and switches 72f, 101 and 70 will open. At the same time, switch 72r will close to reverse the tape 12 and the play time set by the timer circuit 64 will be loaded or stored in the RAM of the microcomputer 65 to immediately start the timer circuit 64.

Step 3: When the first identification signal from the second track of the tape 12 has been detected, the counter 66 will count down or decrement 1 and switch 72r will open to stop tape 14. During the tape stopping, the student can repeat the reproduced master voice aloud.

Step 4: When the timer circuit 64 has elapsed X number of seconds longer than the set time stored in the RAM, the pause time for pronunciation practice will have been terminated and switches 72f, 101 and 70 will close to reproduce the same master materials block again.

Step 5: After the operation from step 3 and step 4 has been repeated as many times as selected, the switches in the record/play section 31 will all open. At the same time, this will stop the timer circuit 64 in the step 5 operation.

Explanation will be next made about a fourth subroutine which, following the third subroutine in which oral practice has been completed, acts to record student's voice of the master block for comparison of the master block voice and the student's voice and which comprises the following eight steps.

Step 1: When the termination of the third subroutine has been detected, switch 72r will close to reverse tape 12.

Step 2: When the starting point of the practised master materials block has been detected with an identification signal from the second track of tape 12, the counter 66 will count down or decrement 1 so that switch 72r will open and switches 72f, 101 and 70 will close to reproduce the same.

Step 3: When the termination of the reproduction has been detected with an identification from the second track of the tape 12, the counter 66 will count up by 1 and switches 101 and 70 will open. At the same time, switches 77 and 100 will close to record the student's practice voice on the third track of the tape 12, while starting the timer circuit 64. Each time an identification signal is detected in the recording mode, the counter 66 will increment 1.

Step 4: When the set time of the timer circuit 64 has been X number of seconds longer than the set time stored in the RAM, switches 72f, 77 and 100 will open and switch 72r will close, resulting in the tape 12 placed in the reversed mode. Each time an identification is detected in the tape reversing operation or mode, the counter 66 will decrement 1.

Step 5: When the count value of the counter 66 has reached a count value representative of the starting point of the oral practice, switch 72r will open and switches 72f, 101 and 70 will close, which puts tape 12 into the reproduction mode.

Step 6: When the first identification signal has been detected in the reproduction mode of step 5, the counter 66 will count up by 1. At the same time, switch 101 will open and switch 102 will close, which puts the third track of tape 12 in the reproduction mode and starts the timer circuit 64.

Step 7: When the set time of the timer circuit 64 has been X number of seconds longer than the time stored in the RAM, switches 72f, 102 and 70 will open to stop tape 12. Simultaneously, the indicator light 18e will be illuminated for a predetermined time period to inquire of the student about whether or not to repeat the just finished oral practice of the master voice by means of a letters "REPEAT?" on the indicator. During the predetermined time period, depressing the push-button 15 will cause the third subroutine to return to step 1. If the push-button 15 is not depressed during the time, then the program will proceed to the next block following the just finished master materials block to execute the third subroutine. If necessary, a push-button may be provided to advance the program to the next block, in addition to the REPEAT push-button 15, so that the indicator 18e continues to light up until either one of the both push-buttons is depressed.

Step 8: When the operation from the step 1 to the step 7 has been terminated with respect to all the blocks of the study, the system will stop and be ready for the assignment of a next new study by operating the pushbutton group 17.

By combining the four subroutine described above with programs and manual operations, a proper program can be created for foreign language self-study on the basis of the five study procedures explained earlier.

Although the second embodiment of the present invention has been explained in the case of use of two tapes, the present invention can be embodied with the use of a single tape. More specifically, as illustrated in FIG. 8, the contents or data of the command tape 16 can be incorporated on the master voice tape 12. In order to meet such requirements, the master voice tape must contain three tracks such that a program is recorded on the first track from the beginning of the tape and at the end of the program, an identification signal is recorded on the second track. Subsequently, the study instructions voice of the first master materials textbook is recorded on the first track and at the end of the study instruction voice, an identification signal is recorded on the second track. The contents of the master study materials are recorded on the first track subsequent to the above already recorded portion thereon, while an identification signal is recorded on the second track with respect to each block in the textbook study. The third track is used to record the student's voice.

Figure 9:
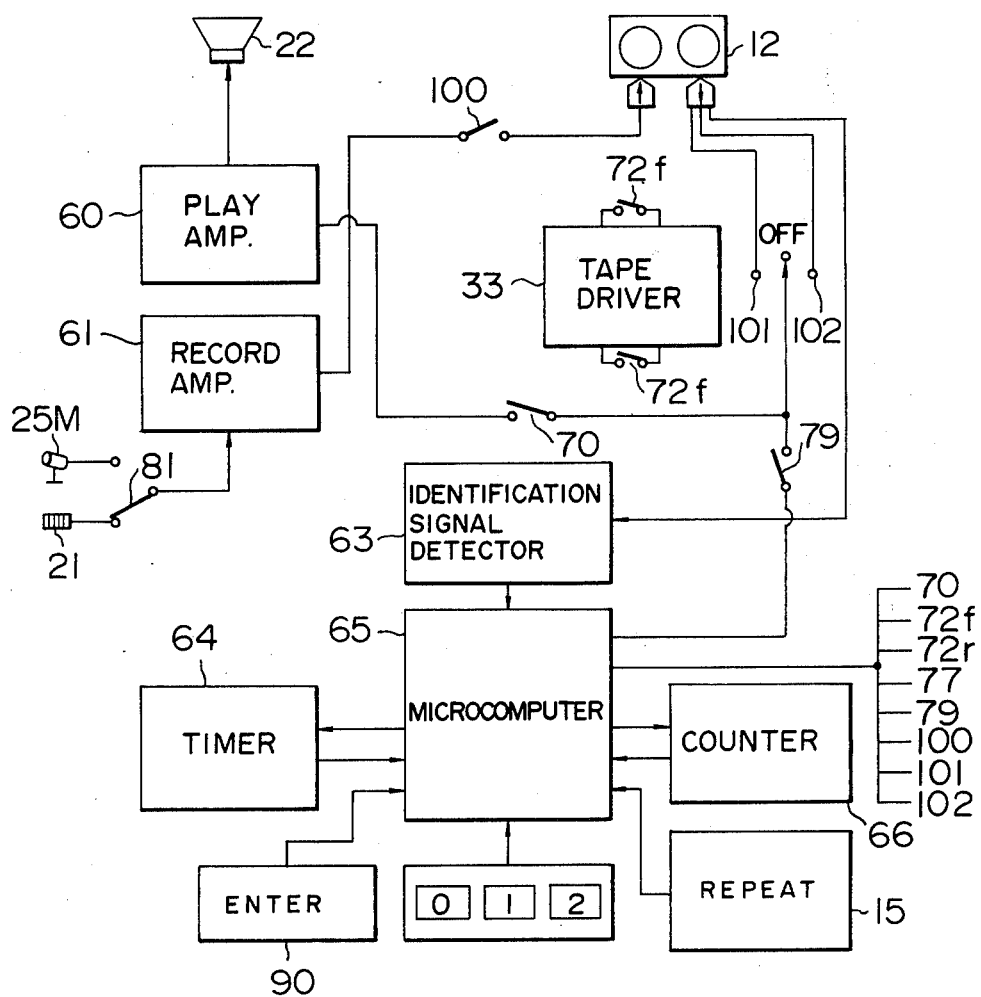
FIG. 9 is a block diagram of the system as a third embodiment of the present invention.

The circuit configuration of the above case is shown in FIG. 9 wherein elements already described with reference to FIG. 7 are denoted by the same reference numerals as in the previous embodiment. There are no new elements in the embodiment of FIG. 9 in addition to FIG. 7 and the operational principle thereof will be easily understood from the explanation of FIG. 7, and therefore the explanation of FIG. 9 will be omitted.

Figure 10:
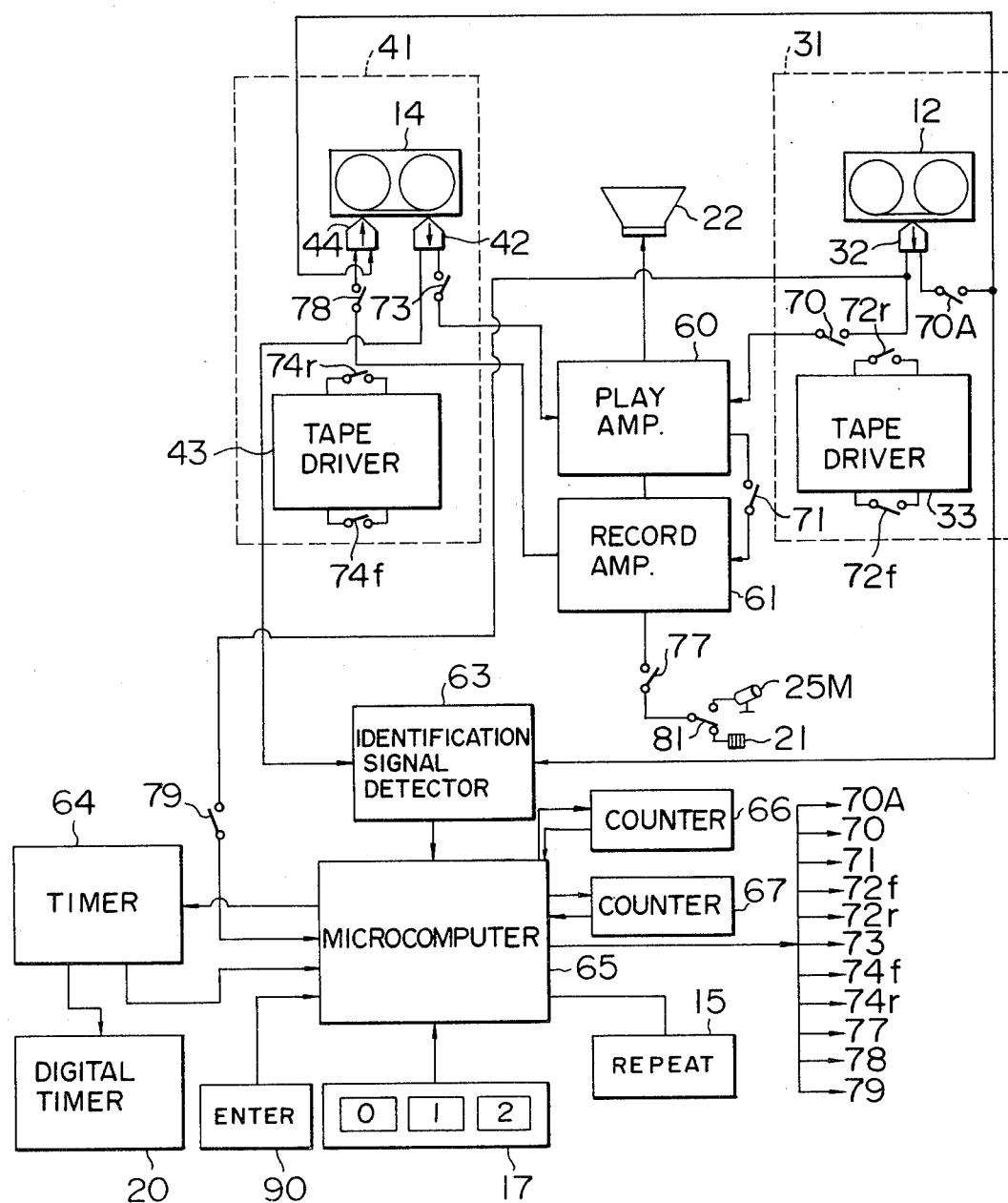
FIG. 10 is a block diagram of the system as a fourth embodiment of the present invention.

There is shown a further embodiment of the present invention in FIG. 10 wherein the contents or data of the program tape 16 are recorded on the first and second tracks of the master voice tape 12 so as to allow the removal of the program play section 51. Similarly, elements already described with reference to FIG. 4 are denoted by the same reference numerals as in the previous embodiments. Also, since the embodiment of FIG. 10 will be readily appreciated from the explanation in connection with FIG. 4, the explanation thereof will be omitted.

While the present invention has been explained with reference to the preferred embodiments shown in the drawings, it should be understood that the invention is not limited to those embodiments but covers all other possible modifications, alternatives and equivalent arrangements included in the scope of the appended claims. For example, the present invention has been disclosed as a tape recorder, but can be embodied as a record/reproduction device which uses magnetic disc.

Further, while the present invention has been explained as a system intended for foreign language self-study, it can also be used for speech therapy cure or speech training in a person's native language, for practice of music in which recorded musical examples are given, or for practice of music as performed on any musical instrument.

In addition, although each tape transport mechanism only has provided forward drive and backward drive in the embodiments of the present invention, the forward drive may include quick forward drive, in addition to record/play drive, for utilization in the step 1 of the second subroutine.

I claim:

1. A study voice record/reproduction system comprising a master study materials reproduction section including a first recording medium for recording thereon master study voice signals and identification signals each inserted between blocks in said master voice signals to distinguish one block from another, first medium driving means for driving said first recording medium, and a reproduction unit for reproducing signals recorded on the first recording medium when the first recording medium is driven forward by said first driving means; a practice record/reproduction section including a second recording medium for recording thereon signals from said master reproduction section or voice signals from a microphone, second medium driving means for driving said second recording medium forward and backward, and a reproduction unit for reproducing on the second recording medium said signals from the master reproduction section or said signals from said microphone when said second medium driving means drives the second recording medium forward; a program reproduction section including a third recording medium for recording thereon instruction voice signals, command program signals and identification signals for distinguishing between said instruction voice signals and said command program signals, third medium driving means for driving said third recording medium forward and backward, and a reproduction unit for reproducing signals recorded on the third recording medium at the time of driving the third recording medium; and a control section for storing the contents of program signals read from said program reproduction means thereby to control each driving of the master study materials reproduction section, said practice record/reproduction section and the program reproduction section in accordance with said program signals.

2. A study voice record/reproduction system comprising command reproduction section including a first recording medium for recording command program signals, instruction voice signals and identification signals for distinguishing between said instruction voice signals and said command program signals, first driving means for driving said first recording medium forward and backward, and a reproduction unit for reproducing signals recorded on the first recording medium when the first recording medium is driven forward; record/reproduction section including a second recording medium having at least one recording track for recording thereon master study voice signals and identification signals each inserted between blocks in said master voice signals to distinguish one block from another and having a record/reproduction track for recording thereon voice signals from a microphone, second driving means for driving said second recording medium forward and backward, a reproduction unit for selectively reproducing signals on said recording track and record/reproduction track of the second recording medium when said second driving means drives the second recording medium forward, and a recording unit for recording voice signals from said microphone on the record/reproduction track of the second recording medium when the second driving means drives the second recording medium forward; and a control section for storing the contents of the program signals read from said command reproduction section into a memory prior to starting of language study thereby to control the reproduction, recording and reversing of said command reproduction section and record/reproduction section on the basis of said identification signals and according to program signals.

3. A study voice record/reproduction system comprising a recording medium having at least one recording track for recording thereon command program signals, instruction voice signals, blocks of master study materials voice signals, and identification signals each inserted between blocks of said master voice signals to distinguish one block from another and having a record/reproduction track for recording thereon voice signals from a microphone; driving means for driving said recording medium forward and backward; reproduction means for selectively reproducing said signals on said recording track and record/reproduction track of the record medium when said driving means drives the record medium forward; a recording unit for recording voice signals from said microphone on the record/reproduction track of the recording medium when the driving means drives the recording medium forward; and control means for storing the contents of said command program signals on the recording medium into a memory prior to starting of language study thereby to control the operation of the driving means, said reproduction means and said recording unit on the basis of said identification signals and the program signals.

4. A study voice record/reproduction system comprising a reproduction section including a first recording medium for recording thereon command program signals, blocks of master study materials voice signals, and identification signals each inserted between blocks of said master voice signals to distinguish one block from another, first driving means for driving said first record medium forward and backward and reproduction means for reproducing signals on the first record medium at the time that said first driving means drives the first record medium; a practice record/reproduction section including a second recording medium for recording thereon signals from said reproduction section and voice signals from a microphone, second driving means for driving said second record medium forward and backward, and record/reproduction means for recording or reproducing said signals from the reproduction section or said signals from said microphone on the second record medium; and a control means for storing the contents of said program signals read from the reproduction section thereby to control the operation of the reproduction section and said practice record/reproduction section according to the program signals.

5. A study voice record/reproduction system as defined in claim 1, 2, 3 or 4 wherein said master study materials voice signals includes at least one study each comprising a plurality of blocks, and wherein said control means or section includes first means for repeatedly reproducing said study as many times as selected, second means, after the reproduction and completion of the study, repeatedly reproducing one of the blocks in the reproduced study as many times as selected so as to provide a pause time immediately after each block reproduction, third means, after the same block has been reproduced, recording the student's voice following the reproduced voice of the same block, fourth means, after the recording, continuously reproducing the same block and said student's voice, and fifth means for causing said second to fourth means to execute all the blocks of the study in sequence.

6. A study voice record/reproduction system as defined in claim 5 wherein said control means or section further includes sixth means for illuminating an indicator for student's direction each time said fourth means has been executed and seventh means for causing said second to fourth means to execute the same block again when the student gives a re-study command.

7. A study voice record/reproduction system as defined in claim 6 wherein said sixth means provides an indication command for a predetermined time period and said seventh means is activated only when said indication command has been issued from the sixth means.

8. A study voice record/reproduction system as defined in claim 5 including means for providing specification for a desired study prior to execution of said first means.

9. A study voice record/reproduction system as defined in claim 5 further including a counter which acts to increment or decrement each time said identification signal is detected, for identifying the reproduction position on said recording medium on which said master study materials voice is recorded.

* * * * *